United States Patent
Ji

(10) Patent No.: US 10,970,854 B2
(45) Date of Patent: Apr. 6, 2021

(54) VISUAL TARGET TRACKING METHOD AND APPARATUS BASED ON DEEP ADVERSARIAL TRAINING

(71) Applicant: Beijing Moviebook Science and Technology Co., Ltd., Beijing (CN)

(72) Inventor: Xiaochen Ji, Beijing (CN)

(73) Assignee: BEIJING MOVIEBOOK SCIENCE AND TECHNOLOGY CO., LTD., Beijing (CN)

(*) Notice: Subject to any disclaimer, the term of this patent is extended or adjusted under 35 U.S.C. 154(b) by 153 days.

(21) Appl. No.: 16/503,658

(22) Filed: Jul. 5, 2019

(65) Prior Publication Data

US 2020/0327680 A1 Oct. 15, 2020

(30) Foreign Application Priority Data

Apr. 12, 2019 (CN) .......................... 201910294731.4

(51) Int. Cl.
| | |
|---|---|
| *G06T 7/246* | (2017.01) |
| *G06T 7/73* | (2017.01) |
| *G06T 7/11* | (2017.01) |
| *G06T 7/00* | (2017.01) |
| *G06T 11/20* | (2006.01) |

(52) U.S. Cl.
CPC .............. *G06T 7/248* (2017.01); *G06T 7/11* (2017.01); *G06T 7/74* (2017.01); *G06T 7/97* (2017.01); *G06T 11/20* (2013.01); *G06T 2207/10016* (2013.01); *G06T 2207/20081* (2013.01); *G06T 2207/20084* (2013.01)

(58) Field of Classification Search
CPC ..... G06T 7/11; G06T 7/74; G06T 7/97; G06T 7/248; G06T 2207/10016; G06T 2207/20081; G06T 2207/20084; G06T 11/20
USPC ........................................................ 382/103
See application file for complete search history.

(56) References Cited

PUBLICATIONS

Computer English Translation of Chinese Patent No. CN106530340A. (Year: 2017).*
Computer English Translation of Chinese Patent No. CN109146912A. (Year: 2019).*

* cited by examiner

*Primary Examiner* — Daniel G Mariam
(74) *Attorney, Agent, or Firm* — Bayramoglu Law Offices LLC

(57) ABSTRACT

A visual target tracking method and apparatus based on deep adversarial training. The method includes: dividing each video frame of video data into several search regions; for each of the search regions, inputting a target template and the search region into a response graph regression network, and outputting a response graph corresponding to a target; for each of the search regions, inputting the target template, the search region, and the response graph into a discrimination network, and outputting a score of the search region; and using positioning information corresponding to a search region with the highest score as positioning information of the target in the video frame. The method can track a target by constructing a plurality of search regions, and can effectively track the target having a change in length-width ratio. End-to-end processing can be achieved by combining the response graph regression network with the discrimination network.

20 Claims, 7 Drawing Sheets

VISUAL TARGET TRACKING METHOD AND APPARATUS BASED ON DEEP ADVERSARIAL TRAINING

CROSS REFERENCE TO THE RELATED APPLICATIONS

This application is based on and claims priority from Chinese Patent Application 201910294731.4, filed on Apr. 12, 2019, the entire contents of which are incorporated herein by reference.

TECHNICAL FIELD

The present application relates to the field of computer vision, and in particular to a visual target tracking method and apparatus based on deep adversarial training.

BACKGROUND

As a basic trend in the field of computer vision, visual target tracking has a wide range of applications in the fields of intelligent video surveillance, human-computer interaction, automatic driving, robot navigation, and the like. However, in practical application scenarios, factors such as scale change, occlusion, and motion blur exert a large negative impact on tracking results. Many trackers that are based on manual features, such as a color feature, a directional gradient feature, a scale invariant feature, in many cases, may not effectively model the appearance of a target, causing the trackers to be easily subjected to tracking failure.

In recent years, deep learning algorithms have been widely used in the field of computer vision. Since the algorithms can automatically learn robust features from massive amount of data, better results than manually designed features can be obtained.

The existing visual target tracking algorithm based on deep learning mainly has the following shortcomings: Firstly, most tracking algorithms have a poor performance of tracking a target having a change in length-width ratio; secondly, a large number of candidate regions need to be extracted in the tracking process, resulting in excessive amount of computation; thirdly, a regression result of a response graph during the tracking process are not accurate enough, which easily causes a large accumulation of errors; and fourthly, regression and classification tasks are separately trained, such that it is impossible to carry out end-to-end training under a unified framework.

SUMMARY

An objective of the present application is to overcome the above problems or at least partially solve or alleviate the above problems.

According to a first aspect of the present application, a visual target tracking method is provided, the method comprising:

a search region division step: for each video frame of video data, dividing the video frame into several search regions;

a positioning information calculation step: for each of the search regions, inputting a target template and the search region into a response graph regression network, and outputting a response graph corresponding to a target, with the response graph indicating positioning information of the target in the target template in the search region;

a discrimination step: for each of the search regions, inputting the target template, the search region, and the response graph into a discrimination network, and outputting a score of the search region; and a positioning step: using positioning information corresponding to a search region with the highest score as positioning information of the target in the video frame.

The method can effectively track a target by constructing a plurality of search regions, even if the length-width ratio of the target changes. By scoring a regression result of the response graph through the discrimination network, the accuracy of discrimination can be improved, and the accumulation of errors is reduced. End-to-end processing can be achieved by combining the response graph regression network with the discrimination network, the operation is simple and the degree of automation is high.

Optionally, the response graph regression network comprises:

a first coding sub-network: comprising a first number of convolutional layers connected in sequence, an input thereof being the target template;

a second coding sub-network: having the same structure as the first coding sub-network and sharing weight values with same, an input thereof being the search region;

a splicing layer: respectively connected to an output end of the first coding sub-network and an output end of the second coding sub-network; and a decoder: comprising a second number of deconvolutional layers connected in sequence, an input end of which is connected to an output end of the splicing layer, and outputting a response graph corresponding to the target, with the response graph indicating positioning information of the target in the target template in the search region.

The method can characterize the search region by using the response graph, and can maintain more image information of the search region compared with the method for generating a feature value. The sub-networks that have the same structure and share parameters are adopted, which can improve the training and calculation speed, and can meet the needs of real-time processing for video data.

Optionally, the discrimination network comprises:

an input module: wherein the target template, the search region, and the response graph are input into the input module, and the input module combines the target template, the search region, and the response graph in a channel number direction, and outputs a first tensor; and a discrimination sub-network: comprising a third number of convolutional layers, a vector processing layer, and an output layer which are sequentially connected, wherein the vector processing layer processes a second tensor output by the last convolutional layer in the discrimination sub-network into a one-dimensional vector and outputs the one-dimensional vector to the output layer, and the output layer outputs a score for the search region.

Optionally, the positioning information comprises: position coordinates and size information.

Optionally, the method further comprises:

a target template update step: every preset time period, updating the target template by using an image portion of the target in the search region with the highest score in the time period.

Optionally, the response graph regression network is trained by using the following steps:

for each video frame in a video sequence, labeling a target object with bounding box coordinates;

generating training data, wherein the training data comprises a target template, a search region, and a response graph, and the method for generating the training data comprises: randomly extracting, from the video sequence, a first video frame and a second video frame which are adjacent, cutting out a target template with a size of M times the size of a target bounding box from the first video frame, and respectively cutting out a search region from the second video frame with a size of K times the size of the target template, where M is greater than 1, and K is greater than 1, in the target template, the target is located at a center position, and in the search region, target objects are evenly distributed at each position, such that a corresponding response graph is generated according to the position of the target in the search region, in which the position of a maximum response value corresponds to the target center, and a response value of a part outside the target bounding box range is 0; and training a deep self-coding structure-based response graph regression network by using a set of the training data.

Optionally, the discrimination network is trained by using the following steps:

scoring a response graph in the training data and marking the score, wherein the training data comprises: a target template, a search region, and a response graph; and training the discrimination network by using the training data and the score of the response graph.

Optionally, the response graph regression network and the discrimination network are subjected to alternate training.

Optionally, the alternate training comprises: when the response graph regression network is trained, back propagation errors including: a mean square error between the response graph regression network and a real response graph and a softmax error returned by the discrimination network; and the discrimination network scoring the response graph based on the back propagation errors.

According to a second aspect of the present application, a visual target tracking apparatus is provided, the apparatus including:

a search region division module configured to divide, for each video frame of video data, the video frame into several search regions;

a positioning information calculation module configured to input, for each of the search regions, a target template and the search region into a response graph regression network, and output a response graph corresponding to a target, wherein the response graph indicates positioning information of the target in the target template in the search region;

a discrimination step module configured to input, for each of the search regions, the target template, the search region, and the response graph into a discrimination network, and output a score of the search region; and a positioning module configured to use positioning information corresponding to a search region with the highest score as positioning information of the target in the video frame.

The apparatus can effectively track a target by constructing a plurality of search regions, even if the length-width ratio of the target changes. By scoring a regression result of the response graph through the discrimination network, the accuracy of discrimination can be improved, and the accumulation of errors is reduced. End-to-end processing can be achieved by combining the response graph regression network with the discrimination network, the operation is simple and the degree of automation is high.

The above and other objectives, advantages and features of the present application will become more apparent to those skilled in the art according to the detailed descriptions of specific embodiments of the present application below with reference to the accompanying drawings.

BRIEF DESCRIPTION OF THE DRAWINGS

The accompanying drawings described herein are intended to provide a further understanding of the present application, which constitute a part of the present application. The illustrative embodiments of the present application and the description thereof are for explaining the present application and do not constitute an undue limitation of the present application. Some specific embodiments of the present application will be described below in detail in an exemplary but not limiting way with reference to the accompanying drawings. The same reference symbols in the accompanying drawings indicate the same or similar components or parts. Those skilled in the art should understand that these accompanying drawings are not necessarily drawn to scale. In the accompanying drawings.

DETAILED DESCRIPTION OF EMBODIMENTS

In order to enable those skilled in the art to better understand the solutions of the present application, the technical solutions in the embodiments of the present application will be clearly and completely described below in conjunction with the accompanying drawings in the embodiments of the present application. Apparently, the described embodiments are merely some of, rather than all, the embodiments of the present application. All other embodiments obtained by a person of ordinary skill in the art based on the embodiments of the present application without creative efforts shall fall within the protection scope of the present application.

It should be noted that the terms "first", "second" and the like in the specification and claims of the present application as well as the above-mentioned accompanying drawings are used to distinguish similar objects, and are not necessarily used to describe a specific order or a precedence order. It should be understood that the data used in this way may be interchanged where appropriate, so that the embodiments of the present application described herein can be implemented in a sequence other than those illustrated or described herein.

In addition, the terms "include" and "have" and any variation thereof are intended to cover a non-exclusive inclusion, for example, a process, method, system, product, or device that includes a series of steps or units is not necessarily limited to those steps or units that are explicitly listed, but may include other steps or units not explicitly listed or inherent to such a process, method, product or device.

According to an embodiment of the present application, an embodiment of a visual target tracking method is further provided. It should be noted that the steps illustrated in flow charts of the accompanying drawings may be performed in a computer system such as a set of computer executable instructions, and although a logic sequence is shown in the flow chart, in some cases the steps shown or described may be performed in a sequence different from the sequence described herein.

Figure 1:
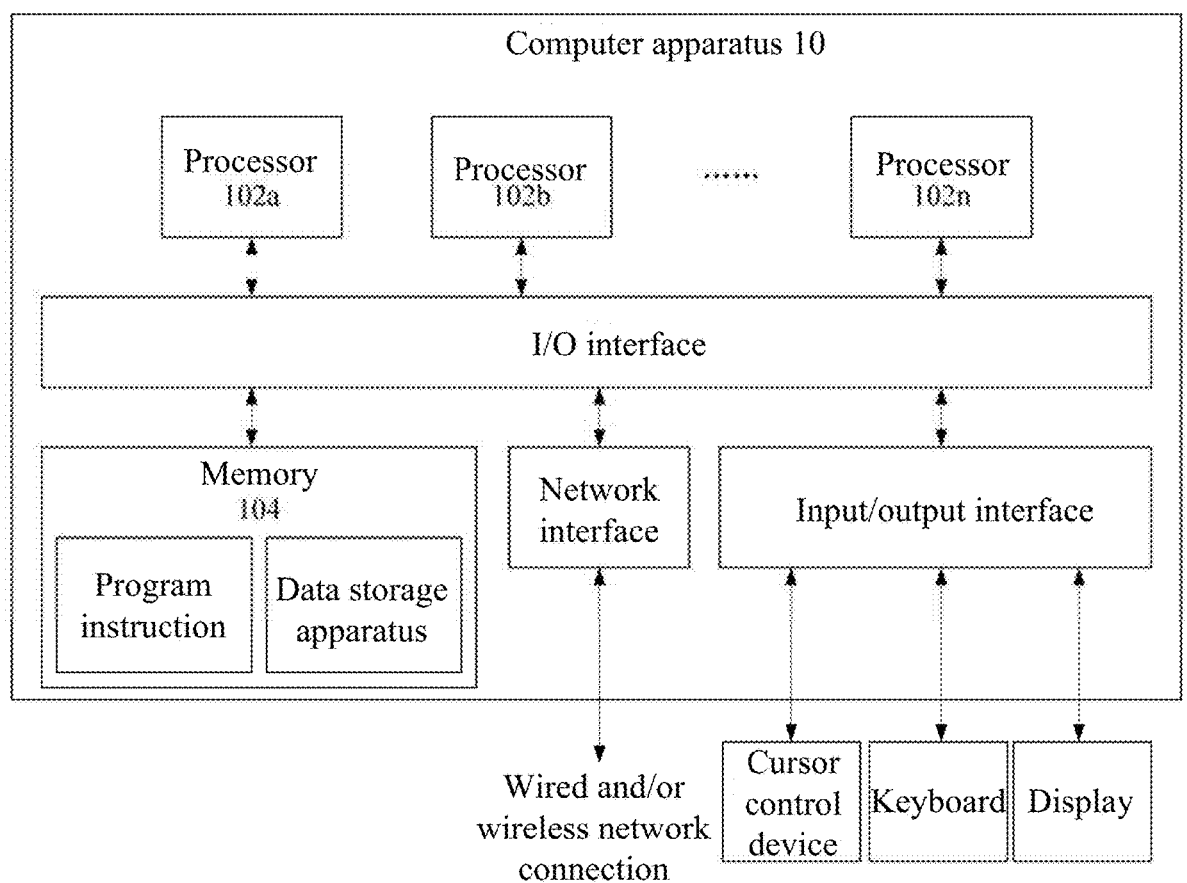
FIG. 1 is a schematic diagram showing a hardware structure of a computer apparatus that operates a visual target tracking method according to one embodiment of the present application.

The method embodiments provided by the embodiments of the present application can be implemented in a mobile terminal, a computer terminal, or a similar computing apparatus. FIG. 1 is a schematic diagram showing a hardware structure of a computer apparatus that operates a visual target tracking method according to an embodiment of the present application. As shown in FIG. 1, a computer apparatus 10 (or a mobile device 10) may include one or more processors (the processors are shown with 102a, 102b, . . . , 102n, and the processor may include, but is not limited to, a processing apparatus such as a microprocessor MCU or a programmable logic device FPGA), a memory 104 for storing data, and a transmission module for communication functions. Besides, the computer apparatus may further include: a display, an input/output (I/O) interface, a universal serial bus (USB) port (which can be included as one of ports of the I/O interfaces), a network interface, a power supply and/or a camera. It will be understood by those of ordinary skill in the art that the structure shown in FIG. 1 is merely illustrative and does not limit the structure of the above electronic apparatus. For example, the computer apparatus 10 may also include more or fewer components than those shown in FIG. 1, or have a configuration different from that shown in FIG. 1.

It should be noted that one or more of the above-described processors and/or other data processing circuits may be referred to herein generally as "data processing circuits". The data processing circuit may be embodied in whole or in part as software, hardware, firmware or any other combination. Moreover, the data processing circuit may be a single independent processing module, or is incorporated in whole or in part into any of other elements in the computer apparatus 10 (or the mobile device). As referred to in the embodiments of the present application, the data processing circuit is controlled as a processor (for example, selection of a variable resistance terminal path connected to an interface).

The memory 104 can be used to store software programs and modules of application software, such as program instructions/data storage devices corresponding to the visual target tracking method according to the embodiment of the present application, and the processor executes various functional applications and data processing by running the software programs and modules stored in the memory 104, namely the method of implementing the above applications. The memory 104 may include a high speed random access memory, and may also include a non-volatile memory such as one or more magnetic storage devices, flash memories, or other non-volatile solid state memories. In some examples, the memories 104 may further include memories remotely set relative to the processor, and these remote memories may be connected to the computer apparatus 10 through a network. Examples of the above network include, but are not limited to, the Internet, intranets, local area networks, mobile communication networks, and combinations thereof.

A transmission device is used for receiving or transmitting data via a network. The specific examples of the network described above may include a wireless network provided by a communication provider of the computer apparatus 10. In one example, the transmission device includes a network interface controller (NIC) that can be connected to other network devices through a base station to communicate with the Internet. In one example, the transmission device may be a radio frequency (RF) module for communicating with the Internet wirelessly.

The display may be, for example, a touch screen type liquid crystal display (LCD) that enables a user to interact with a user interface of the computer apparatus 10 (or the mobile device).

Figure 2:
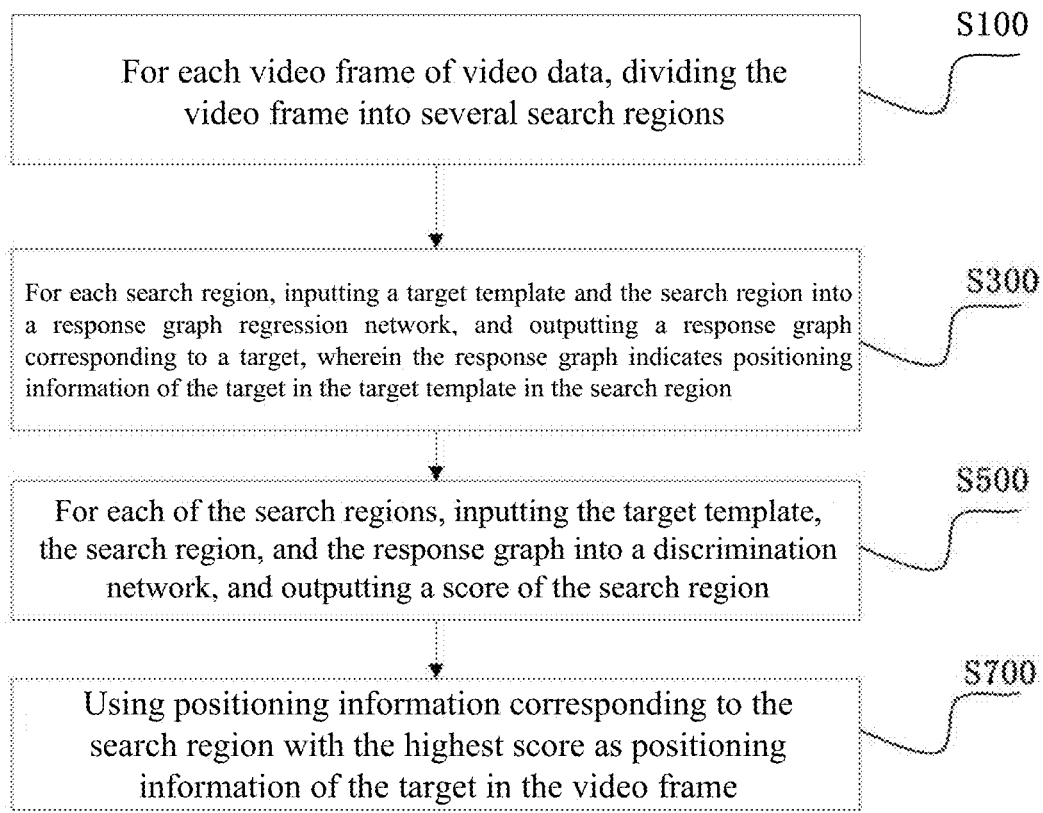
FIG. 2 is a schematic flow chart of a visual target tracking method according to one embodiment of the present application.

In the above operating environment, the present application provides a visual target tracking method. FIG. 2 is a schematic flow chart of a visual target tracking method according to one embodiment of the present application. The method may comprise:

S100: a search region division step: for each video frame of video data, dividing the video frame into several search regions;

S300: a positioning information calculation step: for each of the search regions, inputting a target template and the search region into a response graph regression network, and outputting a response graph corresponding to a target, with the response graph indicating positioning information of the target in the target template in the search region;

S500: a discrimination step: for each of the search regions, inputting the target template, the search region, and the response graph into a discrimination network, and outputting a score of the search region; and S700: a positioning step: using positioning information corresponding to a search region with the highest score as positioning information of the target in the video frame.

The method can effectively track a target by constructing a plurality of search regions, even if the length-width ratio of the target changes. By scoring a regression result of the response graph through the discrimination network, the accuracy of discrimination can be improved, and the accumulation of errors is reduced. End-to-end processing can be achieved by combining the response graph regression network with the discrimination network, the operation is simple and the degree of automation is high.

Optionally, the positioning information comprises: position coordinates and size information.

The method may further comprise: a target template update step: every preset time period, updating the target template by using an image portion of the target in the search region with the highest score in the time period.

The method can update the target template as the target changes, thereby improving the accuracy of subsequent comparisons.

Figure 3:
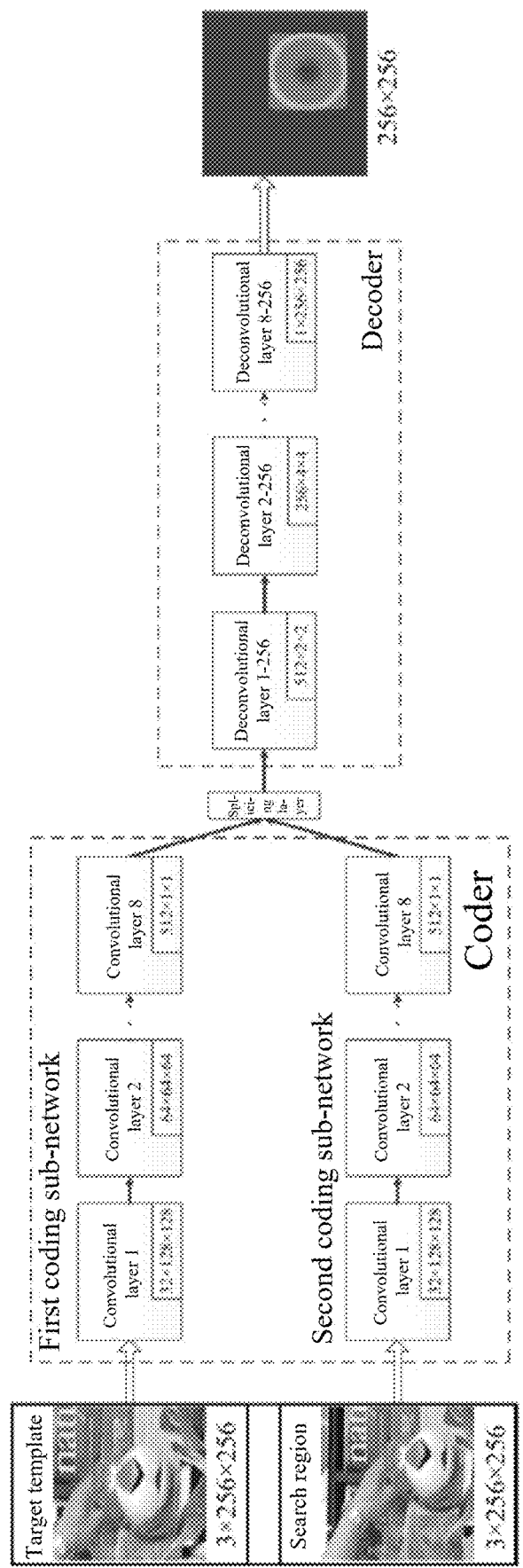
FIG. 3 is a schematic block diagram of a response graph regression network according to one embodiment of the present application.

FIG. 3 is a schematic block diagram of a response graph regression network according to one embodiment of the present application. The response graph regression network may comprise: an encoder, a splicing layer and a decoder which are connected in sequence.

The encoder comprises: a first coding sub-network and a second coding sub-network. The first coding sub-network: including a first number of convolutional layers connected in sequence, an input thereof being the target template; and the second coding sub-network: having the same structure as the first coding sub-network and sharing weight values with same, an input thereof being the search region The splicing layer: respectively connected to an output end of the first coding sub-network and an output end of the second coding sub-network.

The decoder: comprising a second number of deconvolutional layers connected in sequence, an input end of which is connected to an output end of the splicing layer, and outputting a response graph corresponding to the target, with the response graph indicating positioning information of the target in the target template in the search region.

In an optional embodiment, each convolutional layer output of the two coding sub-networks includes 32, 64, 128, 256, 512, 512, 512, 512 feature graphs; the deconvolutional layer output of the decoder includes 512, 256, 128, 64, 32, 16, 8, and 1 feature graphs; one batch normalization layer and one ReLU layer are connected after each convolutional layer; and one batch normalization layer and one ReLU layer are connected after each deconvolutional layer (except the last deconvolutional layer).

The response graph regression network is trained by using the following steps: for each video frame in a video sequence, labeling a target object with bounding box coordinates; generating a response diagram based on a part defined by the bounding box coordinates in the video frame, and composing training data by a target template, a search region, and the response graph; and training a deep self-coding structure-based response graph regression network by using a set of the training data.

The method for generating the training data includes: randomly extracting, from the video sequence, a first video frame and a second video frame which are adjacent, cutting out a target template from the first video frame with a size of M times the size of a target bounding box, and cutting out a search region from the second video frame with a size of K times the size of the target template. M is greater than 1, preferably 4, for example, the search region is cut out from the second video frame with a size of 2 times the width and 2 times the width of the target template, respectively. Optionally, K is greater than 1, and preferably, K is in the range of 1.4 to 3.6; in the target template, the target is located at a center position; in the search region, target objects are uniformly distributed at each position, and a corresponding response graph is generated according to the position of the target in the search region. Optionally, the response graph is subject to a Gaussian distribution. In the response graph, the position of the maximum response value corresponds to the target center, and a response value of a part outside the target bounding box range is 0.

In the training phase, both the target template image and the search region image can be scaled to a size of 256×256 and guaranteed to be 3 channels, and then normalized, that is, operation of subtracting a mean value and being divided by a variance is performed on each channel.

In one optional embodiment, the response graph regression network may specifically be trained using the following steps:

Step A1: Collecting and label a large number of video sequences as a training data set for the response graph regression model. The labeling method is to label the same target object with a rectangular minimum bounding box on each frame of image of each video sequence, and record coordinate values of the upper left corner and the lower right corner of the bounding box. The coordinate values are normalized to between 0 and 1 depending on the size of the corresponding image. Only the same target is labeled in the same video sequence.

Step A2: Using the labeled training data set to generate training data for training the response graph regression network. Each set of training data includes a target template, a search region image, and a corresponding response graph. A specific generation method is as follows: Two frames of images, P1 and P2, with a maximum interval of 10 frames are randomly extracted from the training data. In P1, with a midpoint of a labeled rectangular box as the center, the region with the corresponding length and width being twice the length and width of the rectangular box is cut out as the target template, and similarly, the search region is cut out from P2. The difference is that the positions of the search regions take on Gaussian distribution with the target center point being the center, and the length and width are 1.7 to 2.3 times of the original target length and width. In a true value image of the response graph, the response value of a background region is 0, the response values of a target region take on a Gaussian distribution, and the target center is given a maximum value of 1.

Step A3: Using the generated training data to train the deep self-coding structure-based response graph regression network model, and output the trained response graph regression network. In the training process, the initial learning rate, the batch size, and the maximum number of training rounds of the network are set.

The loss of the deep self-coding structure-based response graph regression network is a mean square error loss.

Figure 4:
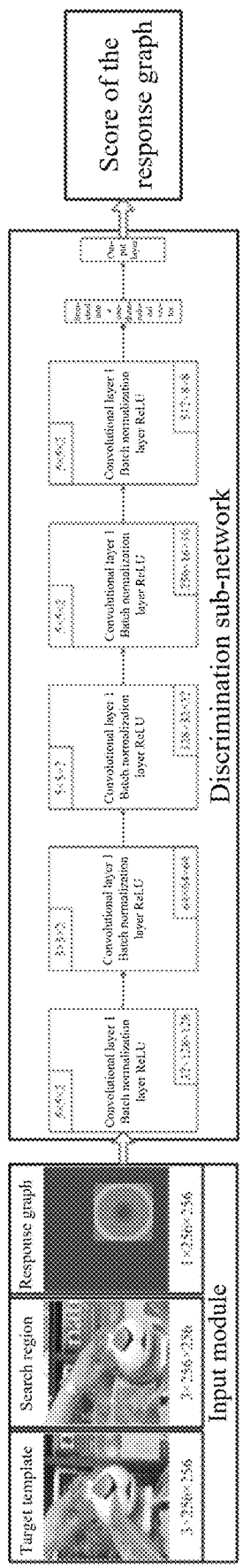
FIG. 4 is a schematic block diagram of a discrimination network according to one embodiment of the present application.

FIG. 4 is a schematic block diagram of a discrimination network according to one embodiment of the present application. Optionally, the discrimination network may comprise: an input module and a discrimination sub-network.

The input module: wherein the target template, the search region, and the response graph are input into the input module, and the input module combines the target template, the search region, and the response graph in a channel number direction, and outputs a first tensor.

The discrimination sub-network: comprising a third number of convolutional layers, a vector processing layer, and an output layer which are sequentially connected, wherein the vector processing layer processes a second tensor output by the last convolutional layer in the discrimination sub-network into a one-dimensional vector and outputs the one-dimensional vector to the output layer, and the output layer outputs a score for the search region.

In an optional embodiment, the discrimination sub-network may include five convolutional layers and one output layer, and one batch normalization layer and one ReLU layer are connected after each convolutional layer. The output layer includes two neurons. Convolution kernels of the five convolutional layers each have a size of 5×5 and a step size of 2. The numbers of output feature graph channels are 32, 64, 128, 256, and 512, respectively.

The discrimination network can be trained using the following steps: scoring a response graph in the training data and marking the score, wherein the training data comprises: a target template, a search region, and a response graph; and training the discrimination network by using the training data and the score of the response graph. Scores may include a variety of forms, such as specific score values or score sections. The score sections can be divided into a plurality of levels. For example, three levels that are very similar, relatively similar, and dissimilar; or two levels that are similar (true) and dissimilar (false).

In one optional embodiment, the discrimination network may be trained using the following steps:

Step B1: Using the training data set generated in step A1 to generate corresponding training data. The training data is divided into three groups, G1, G2, and G3, where: G1 includes a target template, a search region, and a generated real response graph; G2 includes a target template, a search region, and a generated false response graph; and G3 includes a target template, a search region, and a corresponding response graph predicted by the response graph regression model. In the generated false response graph, the intersection-over-union of the target region to a real labeling box is less than 0.3.

Step B2: Using the generated training data to train a discrimination network model that is based on a deep convolutional neural network, and output the trained discrimination network model. That is, when G1 is an input, a discrimination network output is true, and when G2 and G3 are input, a discrimination network output is false. When each group is input, three images of each group are combined in the channel number direction, that is, the network input is a tensor with a size of 256×256×7, where 7 includes: a target template channel number of 3+ a search region image channel number of 3+ a response graph channel number of 1. A loss function is a softmax loss. In the training process, the initial learning rate, the batch size, and the maximum number of training rounds of the network can be set.

Optionally, the response graph regression network and the discrimination network can be subjected to alternate training. The alternate training includes: when the response graph regression network is trained, back propagation errors comprising: a mean square error between the response graph regression network and a real response graph and a softmax error returned by the discrimination network. The discrimination network scores the response graph based on the error of the back propagation. For example, the response graph generated by the response graph regression network and the corresponding input (the target template and the search region) may be determined to be true. When the discrimination network is trained, a training method is the same as step B2. In the training process, the initial learning rate, the batch size, and the maximum number of training rounds of the network can be set.

Figure 5:
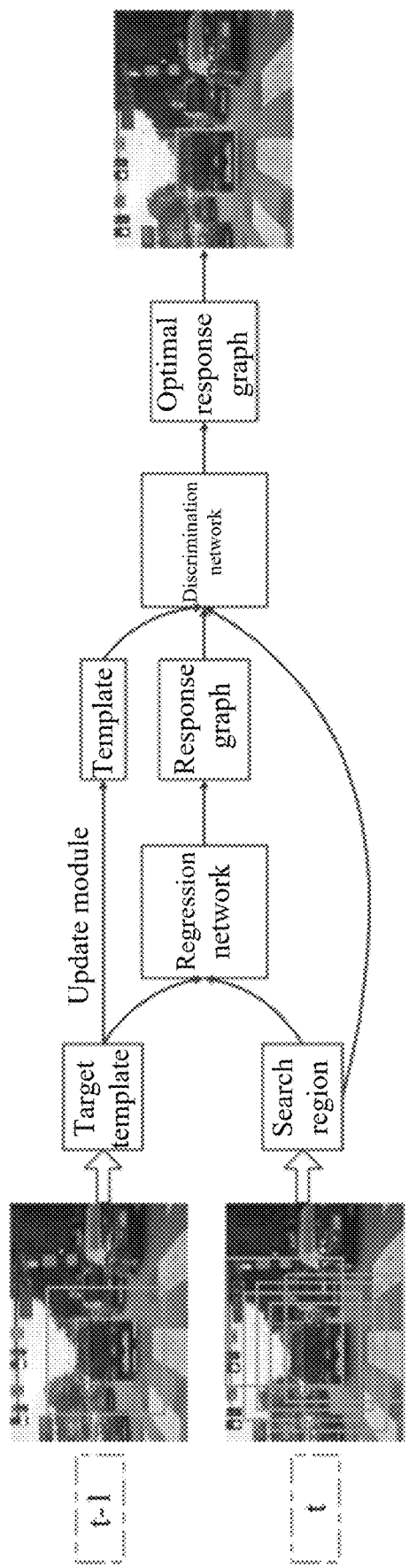
FIG. 5 is a schematic flow chart of a visual target tracking method according to another embodiment of the present application.

After two models are trained, visual target tracking can be performed. FIG. 5 is a schematic flow chart of a visual target tracking method according to another embodiment of the present application. In an optional embodiment, visual target tracking can include the following steps:

Step C1: During the tracking process, saving one target template, update the template every 10 frames, extract 12 search regions in Gaussian distribution, and use the response graph return network output by step A3 to predict the position and scale of the target template in each search region.

Step C2: Inputting the response graph obtained by the regression and the corresponding target template and search region into the discrimination network, and output the score of each group.

Step C3: According to the size of the score predicted in step C2, selecting one group having the largest score to predict the position and scale information of the final target on the current frame.

Figure 6:
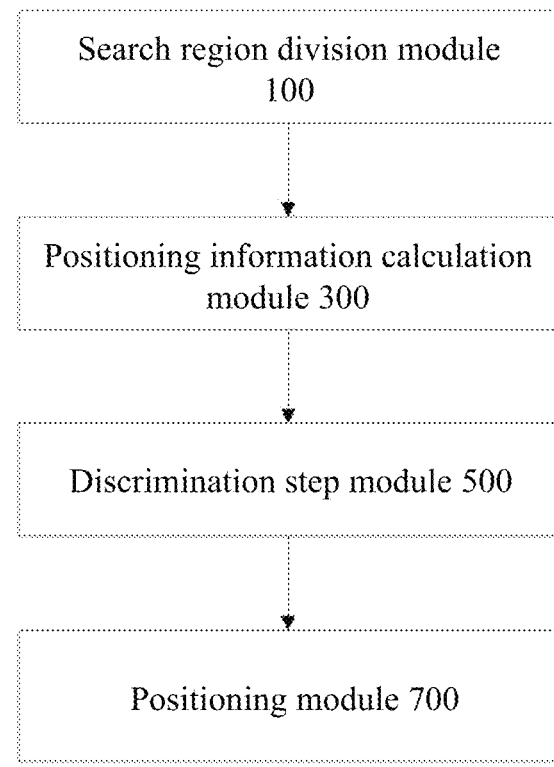
FIG. 6 is a schematic block diagram of a visual target tracking apparatus according to one embodiment of the present application.

An embodiment of the present application further discloses a visual target tracking apparatus. FIG. 6 is a schematic block diagram of a visual target tracking apparatus according to one embodiment of the present application. The apparatus may comprise:

a search region division module 100 configured to divide, for each video frame of video data, the video frame into several search regions;

a positioning information calculation module 300 configured to input, for each of the search regions, a target template and the search region into a response graph regression network, and output a response graph corresponding to a target, wherein the response graph indicates positioning information of the target in the target template in the search region;

a discrimination step module 500 configured to input, for each of the search regions, the target template, the search region, and the response graph into a discrimination network, and output a score of the search region; and a positioning module 700 configured to use positioning information corresponding to a search region with the highest score as positioning information of the target in the video frame.

The apparatus can effectively track a target by constructing a plurality of search regions, even if the length-width ratio of the target changes. By scoring a regression result of the response graph through the discrimination network, the accuracy of discrimination can be improved, and the accumulation of errors is reduced. End-to-end processing can be achieved by combining the response graph regression network with the discrimination network, the operation is simple and the degree of automation is high.

The apparatus may further comprise: a target template update module configured to update, during every preset time period, the target template with an image portion of the target in the search region with the highest score in the time period.

Figure 7:
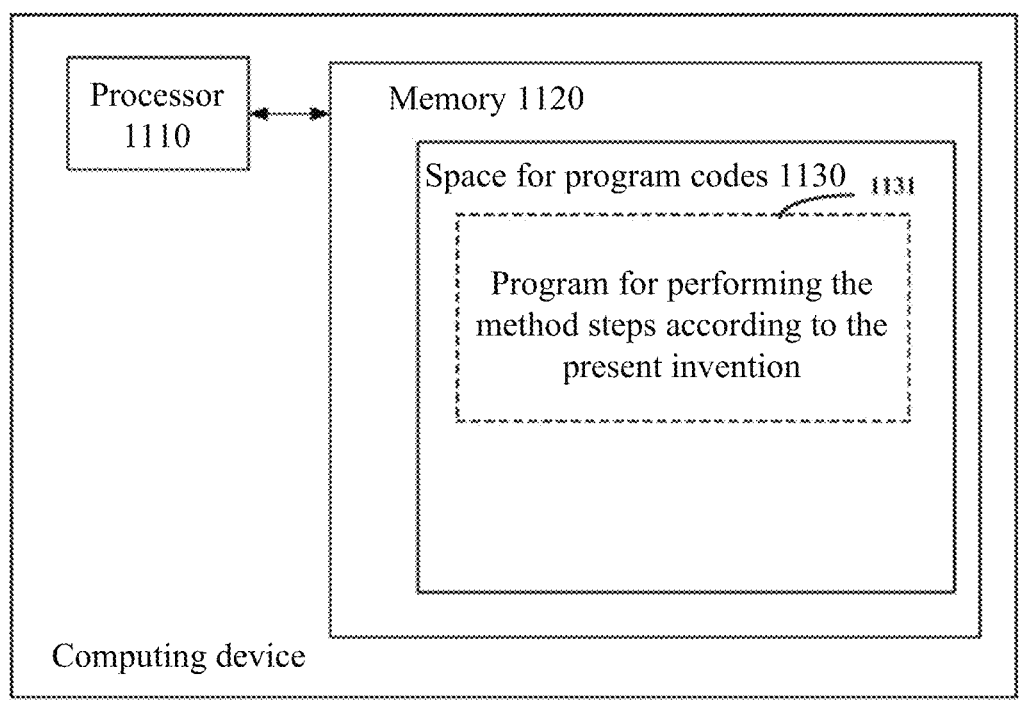
FIG. 7 is a block diagram of one embodiment of a computing device of the present application.

An aspect of an embodiment of the present application provides a computing device. Referring to FIG. 7, the computing device includes a memory 1120, a processor 1110, and a computer program stored in the memory 1120 and executable by the processor 1110. The computer program is stored in a space 1130 for program code in the memory 1120. The computer program, when executed by the processor 1110, is implemented to perform any of steps 1131 of the method in accordance with the present application.

Figure 8:
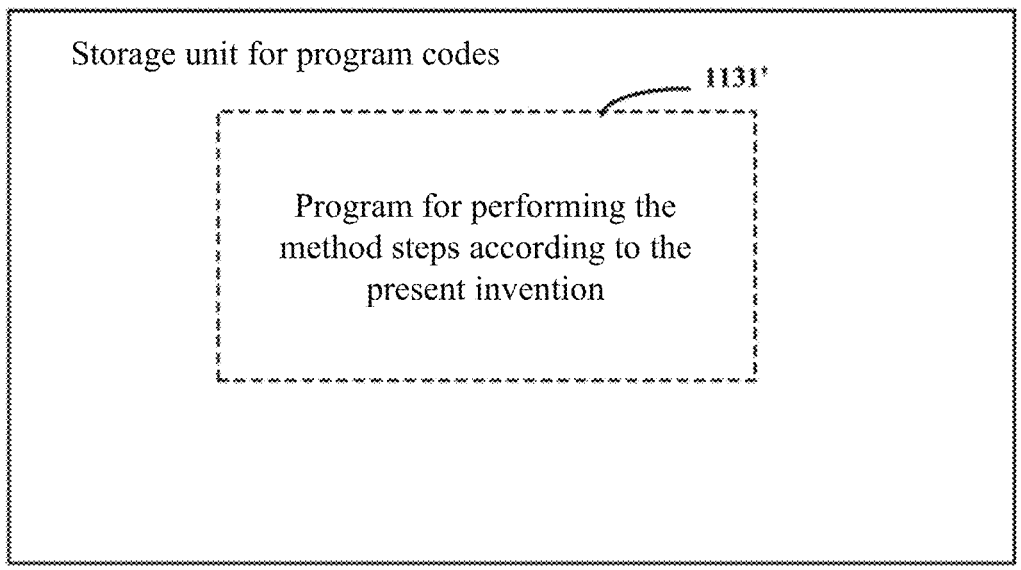
FIG. 8 is a block diagram of one embodiment of a computer readable storage medium of the present application.

One aspect of an embodiment of the present application further provides a computer readable storage medium. Referring to FIG. 8, the computer readable storage medium includes a storage unit for program code. The storage unit is provided with a program 1131' for performing the steps of the method in accordance with the present application, and the program is executed by a processor.

An aspect of an embodiment of the present application further provides a computer program product including instructions, and the computer program product includes computer readable code that, when executed by a computing device, causes the computing device to perform the method as described above.

The above embodiments may be implemented in whole or in part by software, hardware, firmware, or any combination thereof. When implemented by using the software, the embodiment may be implemented in whole or in part in the form of a computer program product. The computer program product includes one or more computer instructions. When the computer program instructions is loaded into and executed by a computer, the processes or functions described in accordance with embodiments of the present application are conducted in whole or in part. The computer may be a general purpose computer, a special purpose computer, a computer network, or other programmable device. The computer instructions can be stored in a computer readable storage medium or transmitted from one computer readable storage medium to another computer readable storage medium. For example, the computer instructions can be transmitted from a website, computer, server or data center to another website site, computer, server, or data center in a wired mode (such as a coaxial cable, an optical fiber, or a digital subscriber line (DSL)) or a wireless mode (such as infrared, Wi-Fi, or microwave). The computer readable storage medium may be any available medium that can be accessed by a computer or a data storage device such as an integrated server data center that includes one or more available mediums. The available medium may be a magnetic medium (such as a floppy disk, a hard disk, or a magnetic tape), an optical medium (such as a DVD), or a semiconductor medium (such as a solid state disk (SSD)), or the like.

A person skilled in the art should be further aware that the unit and algorithm steps of the various examples described in conjunction with the embodiments disclosed herein can be implemented in electronic hardware, computer software, or a combination of both. In order to clearly illustrate hardware and software interchangeability, the compositions and steps of the various examples have been generally described in terms of function in the above description. Whether these functions are performed in hardware or software depends on the specific application and design constraints of the solution. A person skilled in the art can use different methods for each specific application to implement the described functions, but such implementation should not be considered to be beyond the scope of the present application.

It will be understood by those of ordinary skill in the art that all or some steps in the method for implementing the above embodiments may be completed by instructing a processor via a program. The program may be stored in a computer readable storage medium, and the storage medium is a non-transitory medium, such as a random access memory, a read-only memory, a flash memory, a hard disk, a solid state disk, a magnetic tape, a floppy disk, or an optical disc, or any combination thereof.

The above description is only preferred embodiments of the present application, but the protection scope of the present application is not limited thereto, and variations and replacements that can be easily conceived within the technical scope disclosed in the present application by any person skilled in the art should fall within the protection scope of the present application. Therefore, the protection scope of the present application should be defined by the protection scope of the claims.

What is claimed is:

1. A visual target tracking method, comprising:
    a search region division step: for each video frame of video data, dividing the video frame into a plurality of search regions;
    a positioning information calculation step: for each of the plurality of search regions, inputting a target template and the search region into a response graph regression network, and outputting a response graph corresponding to a target, with the response graph indicating positioning information of the target in the target template in the search region;
    a discrimination step: for each of the plurality of search regions, inputting the target template, the search region, and the response graph into a discrimination network, and outputting a score of the search region; and
    a positioning step: using positioning information corresponding to a search region with a highest score as positioning information of the target in the video frame.

2. The method according to claim 1, wherein the response graph regression network comprises:
    a first coding sub-network comprising a first number of convolutional layers connected in a sequence and an input being the target template;
    a second coding sub-network having a same structure as the first coding sub-network and sharing weight values with the first coding sub-network, and an input being the search region;
    a splicing layer connected to an output end of the first coding sub-network and an output end of the second coding sub-network; and
    a decoder comprising a second number of deconvolutional layers connected in a sequence, an input end of the decoder is connected to an output end of the splicing layer, and outputting a response graph corresponding to the target, with the response graph indicating positioning information of the target in the target template in the search region.

3. The method according to claim 1, wherein the discrimination network comprises:
    an input module; wherein the target template, the search region, and the response graph are input into the input module, and the input module combines the target template, the search region, and the response graph in a channel number direction, and outputs a first tensor; and
    a discrimination sub-network comprising a third number of convolutional layers, a vector processing layer, and an output layer sequentially connected, wherein the vector processing layer processes a second tensor output by a last convolutional layer in the discrimination sub-network into a one-dimensional vector and outputs the one-dimensional vector to the output layer, and the output layer outputs a score for the search region.

4. The method according to claim 1, wherein the positioning information comprises position coordinates and size information.

5. The method according to claim 1, wherein the method further comprises:
    a target template update step: every preset time period, updating the target template by using an image portion of the target in the search region with the highest score in the time period.

6. The method according to claim 1, wherein the response graph regression network is trained by using the following steps:
    for each video frame in a video sequence, labeling a target object with bounding box coordinates;
    generating training data, wherein the training data comprises a target template, a search region, and a response graph, and
    the method for generating the training data comprises:
    randomly extracting, from the video sequence, a first video frame and a second video frame, wherein the first video frame and the second video frame are adjacent video frames; cutting out a target template from the first video frame with a size of M times a size of a target bounding box, and cutting out a search region from the second video frame with a size of K times a size of the target template, where M is greater than 1, and K is greater than 1; in the target template, the target is located at a center position, and in the search region, target objects are evenly distributed at each position, such that a corresponding response graph is generated according to the position of the target in the search region, wherein, a position of a maximum response value corresponds to the target center, and a response value of a part outside the target bounding box range is 0; and training a deep self-coding structure-based response graph regression network by using a set of the training data.

7. The method according to claim 1, wherein the discrimination network is trained by using the following steps:
scoring a response graph in the training data and marking the score, wherein the training data comprises a target template, a search region, and a response graph; and
training the discrimination network by using the training data and the score of the response graph.

8. The method according to claim 1, wherein the response graph regression network and the discrimination network are subjected to an alternate training.

9. The method according to claim 8, wherein the alternate training comprises: when the response graph regression network is trained, back propagation errors comprising a mean square error between the response graph regression network and a real response graph and a softmax error returned by the discrimination network; and the discrimination network scoring the response graph based on the back propagation errors.

10. A visual target tracking apparatus, comprising:
a search region division module configured to divide, for each video frame of video data, the video frame into a plurality of search regions;
a positioning information calculation module configured to input, for each of the search regions, a target template and the search region into a response graph regression network, and output a response graph corresponding to a target, wherein the response graph indicates positioning information of the target in the target template in the search region;
a discrimination module configured to input, for each of the search regions, the target template, the search region, and the response graph into a discrimination network, and output a score of the search region; and
a positioning module configured to use positioning information corresponding to a search region with a highest score as positioning information of the target in the video frame, wherein each module is a processor.

11. The method according to claim 2, wherein the discrimination network comprises:
an input module; wherein the target template, the search region, and the response graph are input into the input module, and the input module combines the target template, the search region, and the response graph in a channel number direction, and outputs a first tensor; and
a discrimination sub-network comprising a third number of convolutional layers, a vector processing layer, and an output layer sequentially connected, wherein the vector processing layer processes a second tensor output by a last convolutional layer in the discrimination sub-network into a one-dimensional vector and outputs the one-dimensional vector to the output layer, and the output layer outputs a score for the search region.

12. The method according to claim 2, wherein the positioning information comprises position coordinates and size information.

13. The method according to claim 3, wherein the positioning information comprises position coordinates and size information.

14. The method according to claim 2, wherein the method further comprises:
a target template update step: every preset time period, updating the target template by using an image portion of the target in the search region with the highest score in the time period.

15. The method according to claim 3, wherein the method further comprises:
a target template update step: every preset time period, updating the target template by using an image portion of the target in the search region with the highest score in the time period.

16. The method according to claim 4, wherein the method further comprises:
a target template update step: every preset time period, updating the target template by using an image portion of the target in the search region with the highest score in the time period.

17. The method according to claim 2, wherein the response graph regression network is trained by using the following steps:
for each video frame in a video sequence, labeling a target object with bounding box coordinates;
generating training data, wherein the training data comprises a target template, a search region, and a response graph, and
the method for generating the training data comprises: randomly extracting, from the video sequence, a first video frame and a second video frame, wherein the first video frame and the second video frame are adjacent video frames; cutting out a target template from the first video frame with a size of M times a size of a target bounding box, and cutting out a search region from the second video frame with a size of K times a size of the target template, where M is greater than 1, and K is greater than 1; in the target template, the target is located at a center position, and in the search region, target objects are evenly distributed at each position, such that a corresponding response graph is generated according to the position of the target in the search region, wherein, a position of a maximum response value corresponds to the target center, and a response value of a part outside the target bounding box range is 0; and
training a deep self-coding structure-based response graph regression network by using a set of the training data.

18. The method according to claim 3, wherein the response graph regression network is trained by using the following steps:
for each video frame in a video sequence, labeling a target object with bounding box coordinates;
generating training data, wherein the training data comprises a target template, a search region, and a response graph, and
the method for generating the training data comprises: randomly extracting, from the video sequence, a first video frame and a second video frame, wherein the first video frame and the second video frame are adjacent video frames; cutting out a target template from the first video frame with a size of M times a size of a target bounding box, and cutting out a search region from the second video frame with a size of K times a size of the target template, where M is greater than 1, and K is greater than 1; in the target template, the target is located at a center position, and in the search region, target objects are evenly distributed at each position, such that a corresponding response graph is generated according to the position of the target in the search region, wherein, a position of a maximum response value corresponds to the target center, and a response value of a part outside the target bounding box range is 0; and training a deep self-coding structure-based response graph regression network by using a set of the training data.

19. The method according to claim 4, wherein the response graph regression network is trained by using the following steps:

for each video frame in a video sequence, labeling a target object with bounding box coordinates;

generating training data, wherein the training data comprises a target template, a search region, and a response graph, and the method for generating the training data comprises: randomly extracting, from the video sequence, a first video frame and a second video frame, wherein the first video frame and the second video frame are adjacent video frames; cutting out a target template from the first video frame with a size of M times a size of a target bounding box, and cutting out a search region from the second video frame with a size of K times a size of the target template, where M is greater than 1, and K is greater than 1; in the target template, the target is located at a center position, and in the search region, target objects are evenly distributed at each position, such that a corresponding response graph is generated according to the position of the target in the search region, wherein, a position of a maximum response value corresponds to the target center, and a response value of a part outside the target bounding box range is 0; and training a deep self-coding structure-based response graph regression network by using a set of the training data.

20. The method according to claim 2, wherein the discrimination network is trained by using the following steps:

scoring a response graph in the training data and marking the score, wherein the training data comprises a target template, a search region, and a response graph; and training the discrimination network by using the training data and the score of the response graph.

* * * * *